US007219085B2

(12) United States Patent
Buck et al.

(10) Patent No.: US 7,219,085 B2
(45) Date of Patent: May 15, 2007

(54) SYSTEM AND METHOD FOR ACCELERATING AND OPTIMIZING THE PROCESSING OF MACHINE LEARNING TECHNIQUES USING A GRAPHICS PROCESSING UNIT

(75) Inventors: Ian Andrew Buck, Mountain View, CA (US); Patrice Y. Simard, Bellevue, WA (US); David W. Steinkraus, Santa Fe, NM (US)

(73) Assignee: Microsoft Corporation, Redmond, WA (US)

( * ) Notice: Subject to any disclaimer, the term of this patent is extended or adjusted under 35 U.S.C. 154(b) by 396 days.

(21) Appl. No.: 10/837,382

(22) Filed: Apr. 30, 2004

(65) Prior Publication Data

US 2005/0125369 A1   Jun. 9, 2005

Related U.S. Application Data

(60) Provisional application No. 60/528,578, filed on Dec. 9, 2003.

(51) Int. Cl.
*G06F 15/80* (2006.01)
(52) U.S. Cl. .................................. 706/12; 345/505
(58) Field of Classification Search ............... 706/12
See application file for complete search history.

(56) References Cited

U.S. PATENT DOCUMENTS 5,343,537 A * 8/1994 Bellegarda et al. ......... 382/186

OTHER PUBLICATIONS

Adrian Ilie, Optical Character Recognition on Graphics Hardware, Integrative Paper, 2002. ☐☐☐☐.*

Matic et al., QuickStroke: An Incremental On-line Chinese Handwriting Recognition System, 2002.*
Hassoun, Fundamentals of Artificial Neural Networks, 1995, MIT Press, p. 202.*
Bolz, J., Farmer, I., Grinspun, E., and Schröoder, P., "Sparse matrix solvers on the GPU: conjugate gradients and multigrid", *ACM Transactions on Graphics (TOG)*, v.22 n.3, pp. 917-924, Jul. 2003.
Hillesland, K. E., Molinov, S., and Grzeszczuk, R., "Nonlinear Optimization Framework for Image-Based Modeling on Programmable Graphics Hardware", in *ACM Transactions on Graphics*, pp. 925-934, (2003).
Kirmse, Andrew, "Artificial Neural Networks on Programmable Graphics Hardware" in *Game Programming Gems 4*, published by Charles River Media, pp. 373-377, Mar. 2004 (also see http://www.charlesriver.com/titles/gamesgems4.html).

(Continued)

*Primary Examiner*—Anthony Knight
*Assistant Examiner*—Nathan H. Brown, Jr.
(74) *Attorney, Agent, or Firm*—Lyon & Harr, L.L.P.; Craig S. Fischer

(57) ABSTRACT

A system and method for processing machine learning techniques (such as neural networks) and other non-graphics applications using a graphics processing unit (GPU) to accelerate and optimize the processing. The system and method transfers an architecture that can be used for a wide variety of machine learning techniques from the CPU to the GPU. The transfer of processing to the GPU is accomplished using several novel techniques that overcome the limitations and work well within the framework of the GPU architecture. With these limitations overcome, machine learning techniques are particularly well suited for processing on the GPU because the GPU is typically much more powerful than the typical CPU. Moreover, similar to graphics processing, processing of machine learning techniques involves problems with solving non-trivial solutions and large amounts of data.

35 Claims, 10 Drawing Sheets

OTHER PUBLICATIONS

Kruger, J. and Westermann, R., "Linear Algebra Operators for GPU Implementation of Numerical Algorithms", *ACM Transactions on Graphics* 22, 3 (Jul.), pp. 908-916, (Proceedings of ACM SIGGRAPH 2003).

Larsen, S.E. and McAllister, D., "Fast matrix multiplies using graphics hardware", in *Proc. of the 2001 ACM/IEEE conference on Supercomputing* (CDROM), p. 55-55, Nov. 10-16, 2001, Denver, Colorado.

Lefohn, A. and Whitaker, R., "A gpu-based, three-dimensional level set solver with curvature flow", *Technical report*, University of Utah, Dec. 2002.

Purcell, T.J., Buck, I., Mark, W.R., and Hanrahan, P., "Ray tracing on programmable graphics hardware", in *Proc. of SIGGRAPH*, pp. 703-712, (2002).

Venkatasubramanian, S., "The Graphics Card as a Stream Computer", AT&T Research Labs, 2003.

* cited by examiner

SYSTEM AND METHOD FOR ACCELERATING AND OPTIMIZING THE PROCESSING OF MACHINE LEARNING TECHNIQUES USING A GRAPHICS PROCESSING UNIT

CROSS REFERENCE TO RELATED APPLICATIONS

The application claims the benefit of a previously-filed provisional patent application having Ser. No. 60/528,578 filed on Dec. 9, 2003.

TECHNICAL FIELD

The present invention relates in general to computer processing techniques and more particularly to a system and method for processing machine learning techniques (such as neural networks) and other non-graphics applications using a graphics processing unit (GPU) to accelerate and optimize the processing.

BACKGROUND OF THE INVENTION

A graphics processing unit (GPU) is an integral part of a modern personal computer (PC). The GPU is a single-chip processor that is designed to accelerate the real-time three-dimensional (3D) graphics that are displayed to a user. Initially a feature of high-end graphics workstations, the GPU has found its way onto the personal computer bus as an accelerator of graphics functions for which a conventional central processing unit (CPU) was ill-suited or simply too slow.

Computer graphics began as line drawings on calligraphic displays, which were generally modified oscilloscopes. The computation for these displays required vector operations including general geometric transformations, clipping to boundaries of the display devices, and perspective transformations for 3D displays. The advent of inexpensive commodity semiconductor memory prompted the replacement of line drawing systems by raster graphics processor, which refreshed television-like displays through a frame buffer memory. Because users generally prefer to see shaded solid surfaces instead of line drawings for most applications, raster graphics quickly displaced line drawings. Instead of straight line segments, as was used in line drawings, the geometric building blocks (or primitives) for the raster graphic systems were polyhedral surfaces constructed from an array of triangles. The display primitives were a rectangular array of pixels stored in the frame buffer memory. Rows of the array correspond to the discrete scan lines on the raster scan cathode ray tube (CRT) display.

As graphics progressed from line drawings to raster graphics, the need for greater processing power led to the inclusion of mathematical co-processors on PCs. A mathematical co-processor is an integral floating point co-processor that shares the host CPU's instruction stream and has access to CPU memory. Other types of integrated co-processors are CPU extensions such as Multimedia Extensions (MMX) or Streaming SIMD Extensions (SSE), which have parallel data paths, asynchronous execution, and also have access to the CPU memory.

The demand for ever-increasing higher quality and greater realism in 3D graphics led to the need for greater graphics processing power. In order to meet this need, the GPU was introduced to perform the computationally-intensive graphics tasks. This unburdened the CPU and freed the CPU to perform other processing tasks. In its present day incarnation, the GPU is a prominent component of the PC with its own dedicated path to main CPU memory as well as its own dedicated graphics memory. In contrast to mathematical co-processors, the GPU is an autonomous special purpose processor with its own instruction streams, datapath, and dedicated memory.

Current trends in GPU design and configuration have given them larger dedicated memory, higher bandwidth to graphics memory, and increased internal parallelism. In addition, current GPUs are designed with ever-increasing degrees of programmability. With the introduction of programmability, the GPU has gained enough flexibility to find use in non-graphics applications. Furthermore, the data parallel architecture of GPUs delivers dramatic performance gains, compared to CPUs, for computationally-intensive applications. Extensions to alternative graphics algorithms and scientific computing problems have been explored in a number of instances.

Applications directed to interactive use (such as speech recognition and handwriting recognition), however, have attracted relatively little interest. One reasons for this is the implementation of these algorithms for processing by the GPU is difficult and has several limitations. For general purpose computing, GPUs are essentially stream processors with limitations. Dealing with and circumventing these limitations requires a style of programming and processing that is neither obvious nor intuitive.

These interactive use applications typically have non-trivial solutions and deal with large amounts of data. In these situations, machine learning techniques are the preferred solution techniques. Machine learning techniques operate by automatically adjusting parameters of an algorithm so that, after training, the input is correctly classified. For example, assume the task is to assign the correct ASCII label to a pixel image of an "A". Unfortunately, training typically involves presenting hundreds of thousands of pairs (input, target) to algorithms which themselves have hundreds of thousands of operations. As a result, training can take a great deal of time, even on the fastest available machines. Testing or using the algorithm in real-world conditions can also be prohibitively expensive.

Therefore, what is needed is a system and method for using a GPU to process machine learning techniques. What is further needed is a system and method for accelerating and optimizing the processing of machine learning techniques by circumventing the limitations of the GPU. This would ensure that the full processing power of the GPU is harnessed in solving interactive use applications (such as speech and handwriting recognition) using machine learning techniques.

SUMMARY OF THE INVENTION

The invention disclosed herein relates to a system and method for using a graphics processing unit (GPU) to process machine learning techniques. The present invention alleviates the computational limitation of central processing units (CPUs) by porting a portion of the CPU processing to the GPU. More specifically, the present invention ports the machine learning architecture, traditionally handled by the CPU, to the GPU. Machine learning techniques are particularly well-suited for porting to the GPU because the GPU typically is more powerful than the CPU, and because machine learning techniques involve solving problems having non-trivial solutions and requiring significantly more computation than data access, such as speech and handwriting recognition. This is in contrast to memory based classification or search, which have a high data access compared to computation. If data transfer to the GPU takes too much time, the benefit of doing computation on the GPU is decreased. In other words, if as much data is transferred to the GPU as is needed for computation, the bottleneck becomes the transfer of data and any net improvement will be nullified.

The method of the present invention includes training a machine learning technique using a GPU without subsequent testing on GPU, testing a machine learning technique using a GPU without prior training on the GPU, and both training and testing on the GPU. In particular, the invention disclosed herein includes a computer-implemented method for processing an interactive use computer application. This method includes processing a machine learning technique using a graphics processing unit to obtain a solution to a function, and outputting the solution for use by the interactive use computer application. The method further includes having the training learnable parameters of the machine learning technique using the graphics processing unit to obtain trained learnable parameters and using the trained learnable parameters to obtain the solution. The interactive use computer application can be one of a speech recognition application and a handwriting recognition application. Moreover, the machine learning technique can be a neural network.

The method can further include storing the learnable parameters on a central processing unit, and storing at least some of the learnable parameters on the graphics processing unit. Obtaining a solution to a function can be performed by using a pixel shader to compute an inner product that is at least one of a vector inner product, and a matrix inner product. The method can further include decomposing the inner product into sub-problems and performing multiple passes over the sub-problems using the pixel shader. Obtaining a solution to a function can be achieved by using a pixel shader to compute an outer product. The method can also include computing the outer product using texture mapping. Obtaining a solution to a function can be done by using a pixel shader to perform a matrix transpose. The method can also include performing the matrix transpose using texture mapping.

The invention disclosed herein also includes a process for accelerating and optimizing a machine learning technique using a graphics processing unit. This method includes using pixel shaders on the graphics processing unit to train learnable parameters of the machine learning technique, using pixel shaders on the graphics processing unit and the trained learnable parameters to obtain results from the machine learning technique, and outputting the results for use by an application.

The process also includes locating at least some of the learnable parameters on the graphics processing unit, and using the pixel shaders to compute at least one of: (a) a vector inner product; (b) a matrix inner product; (c) an outer product; (d) a matrix transpose. The machine learning technique can be a neural network, and the neural network can be at least one of: (a) a multiplayer, fully connected neural network; (b) a convolutional neural network. The machine learning technique can also use an Expectation Maximization (EM) algorithm and a K-means technique and a Learning Vector Quantization (LVQ) technique. The process also includes preprocessing data using the graphics processing unit.

The invention disclosed herein also includes a computer-readable medium having computer-executable instructions for processing a machine learning technique using a graphics processing unit. The medium includes loading shaders onto the graphics processing unit, loading query data onto a central processing unit, calling the shaders to process a trained function on the graphic processing unit using the machine learning techniques, and obtaining results for use by an interactive use application.

The computer-readable medium further includes having at least some learnable parameters reside on the graphics processing unit, and preprocessing the query data to obtain input data and loading the input data onto the graphics processing unit. Moreover, the medium includes using the shaders to compute primitive operations on the graphics processing unit. The primitive operations include at least one of: (a) a vector inner product; (b) a matrix inner product; (c) an outer product; (d) a matrix transpose.

The machine learning technique can be a neural network, and a gradient descent technique. The computer-readable medium further includes having at least some of adjustable parameters of the gradient descent technique reside on the graphics processing unit. The interactive use application can be a handwriting recognition application. Moreover, the machine learning technique can be a neural network and further include performing classification using the neural network. The interactive use application also can be an optical character recognition application, the machine learning technique is a neural network and further include performing classification using the neural network. The machine learning technique can be a gradient descent technique and include storing gradient descent parameters on the graphics processing unit, and extending a mantissa of the gradient descent parameters by doubling the gradient descent parameters.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Graphics processing units (GPUs) have traditionally been used to accelerate real time 3D graphics displays. As a result of increased processing power and programmability, however, GPUs are also capable of efficiently processing other non-graphics related processes. These processes typically have been limited to alternative graphics algorithms and scientific computing problems involving large amounts of data and processing (such as computational fluid dynamics). Interactive use applications, however, such as speech and handwriting recognition, have attracted relatively little interest due to the limitations and characteristics of the GPU architecture.

The machine learning GPU execution system and method described herein alleviates the computational limitations of CPUs by porting some or all of the CPU processing to the GPU. More specifically, the system and method transfers an architecture that can be used for a wide variety of machine learning techniques from the CPU to the GPU. The transfer of processing to the GPU is accomplished using several novel techniques that overcome the limitations and work well within the framework of the GPU architecture. With these limitations overcome, machine learning techniques are particularly well-suited for processing on the GPU because the GPU is typically much more powerful than the typical CPU. Moreover, similar to graphics processing, processing of machine learning techniques involves problems with solving non-trivial solutions and large amounts of data.

II. Exemplary Operating Environment

The machine learning GPU execution engine and method disclosed herein are designed to operate in a computing environment. The following discussion is intended to provide a brief, general description of a suitable computing environment in which the machine learning GPU execution engine and method may be implemented.

Figure 1:
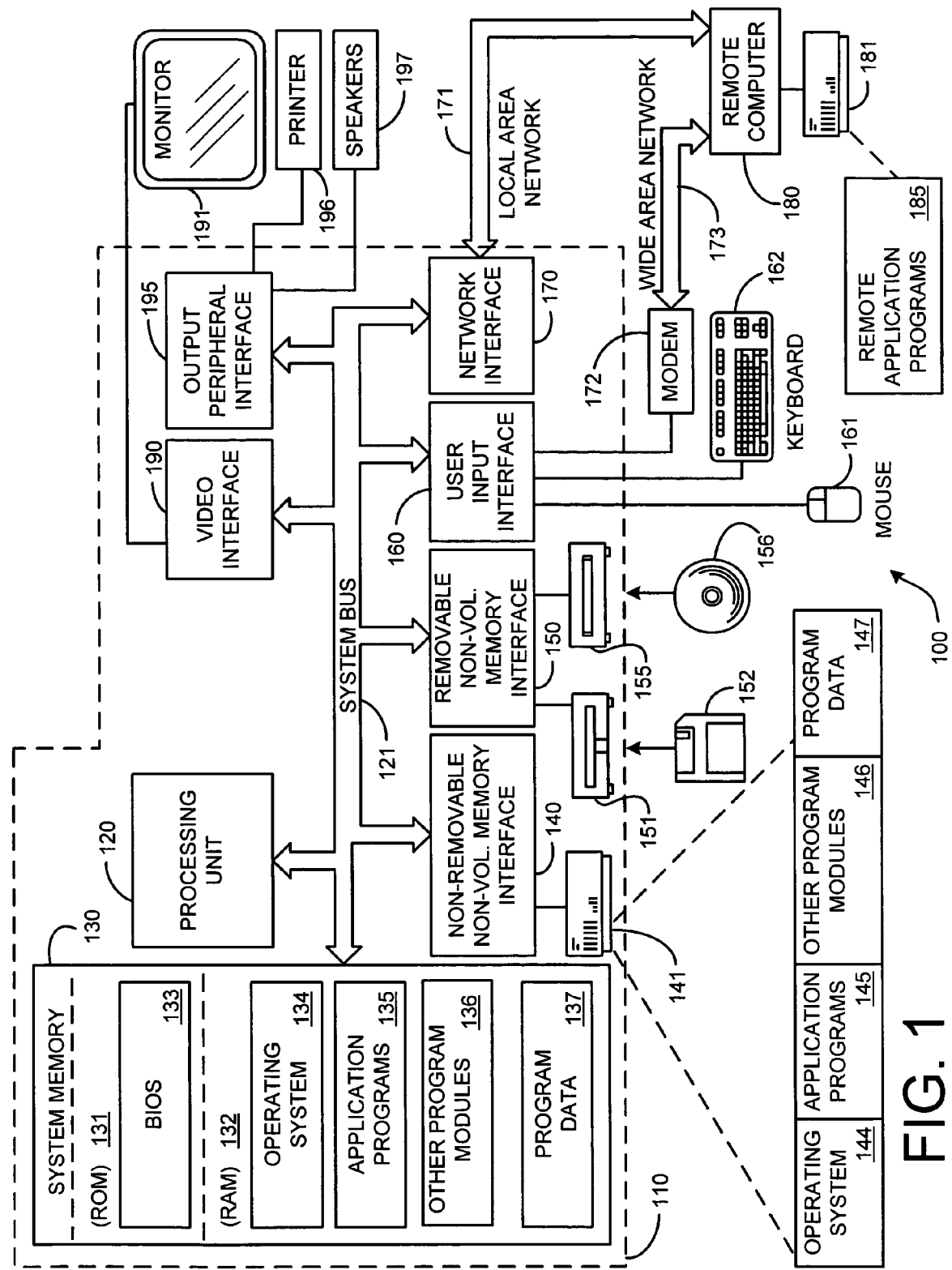
FIG. 1 illustrates an example of a suitable computing system environment in which the machine learning GPU execution engine and method may be implemented.

FIG. 1 illustrates an example of a suitable computing system environment in which the machine learning GPU execution engine and method may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The machine learning GPU execution engine and method is operational with numerous other general purpose or special purpose computing system environments or configurations. Examples of well known computing systems, environments, and/or configurations that may be suitable for use with the machine learning GPU execution engine and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The machine learning GPU execution engine and method may be described in the general context of computer-executable instructions, such as program modules, being executed by a computer. Generally, program modules include routines, programs, objects, components, data structures, etc., that perform particular tasks or implement particular abstract data types. The machine learning GPU execution engine and method may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the machine learning GPU execution engine and method includes a general-purpose computing device in the form of a computer 110.

Components of the computer 110 may include, but are not limited to, a processing unit 120 (such as a central processing unit, CPU), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

III. General Overview

GPUs are designed to accelerate real-time 3D graphics display. As demand for better graphics increases, GPUs are quickly becoming more powerful and programmable. As a result of their increased programmability, GPUs are also capable of efficiently processing many other type of non-graphics related processes. The machine learning GPU execution engine and method disclosed herein alleviates the computational constraints of CPUs by porting some of the CPU processing to the GPU. More specifically, the present invention ports the machine learning architecture, traditionally handled by the CPU, to the GPU. As explained in detail below, this requires the use of several implementation techniques to overcome the several limitations of the GPU and to accelerate and optimize GPU processing of the machine learning techniques. For general purpose computing, machine learning is particularly well-suited for porting to the GPU because the GPU is more powerful than the typical CPU.

Figure 2:
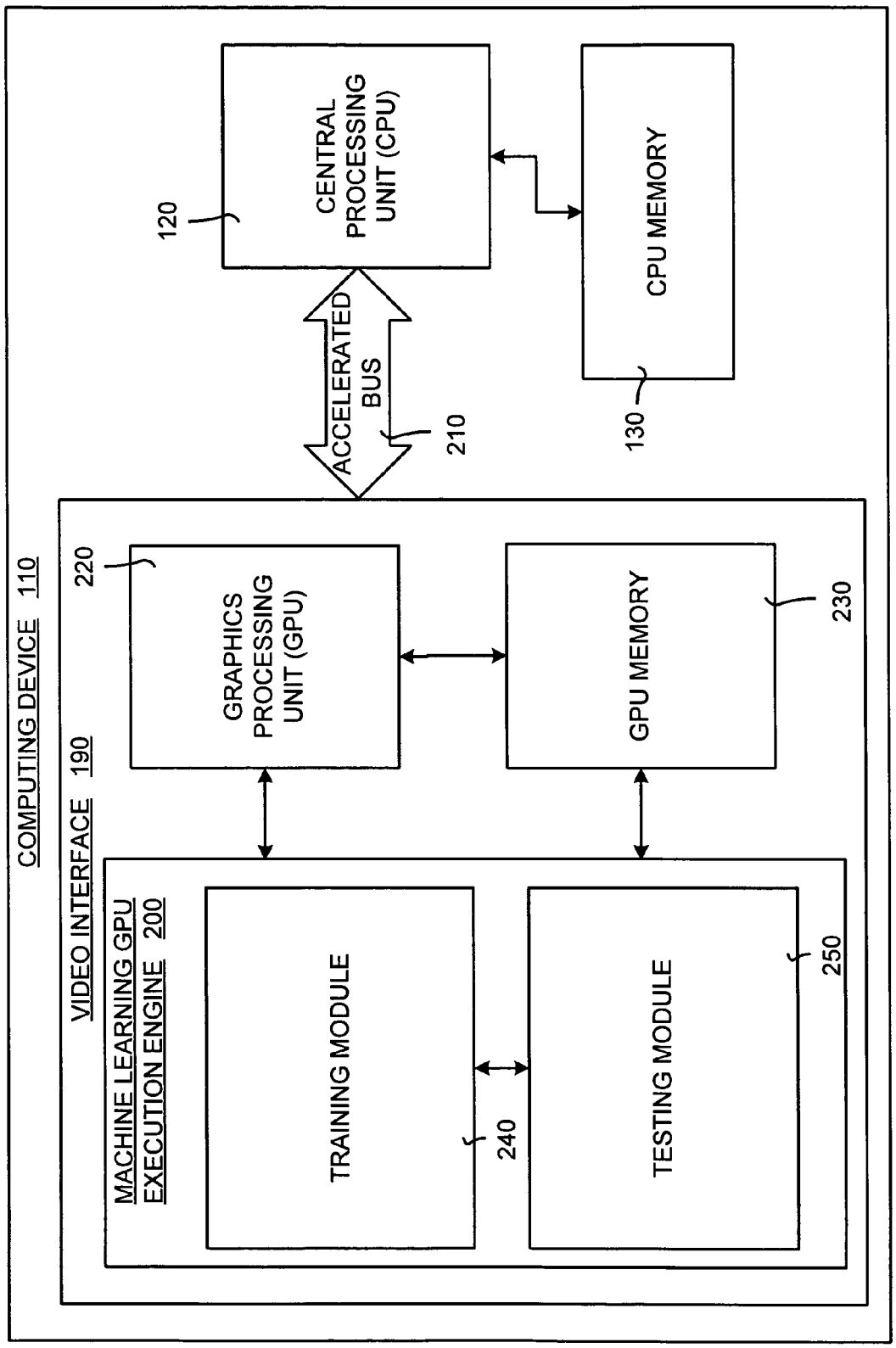
FIG. 2 is a block diagram illustrating an exemplary implementation of the machine learning GPU execution engine and method disclosed herein.

FIG. 2 is a block diagram illustrating an exemplary implementation of the machine learning GPU execution engine and method disclosed herein. It should be noted that FIG. 2 is merely one of several ways in which the machine learning GPU execution engine and method may implemented and used. A machine learning technique can be processed by the GPU during both training and testing (or use) phases. Training phase refers to the computation in which the parameters of the algorithm are adjusted using training data. The testing phase refers to the computation in which the system is used to compute useful information as a function of input data and the trained parameters. Training typically takes a long time, but it can be done once and for all. Testing, which can refer to using the deployed system, sometimes requires very fast response time, as for instance, in character or speech recognition. In applications where training takes an extended period of time, but maximum hardware independence is desired, the training will be done on the GPU, but testing will be done on the CPU. It is also possible for a training algorithm to be too complex to run on the GPU, while the testing algorithm is simpler (such as a trainable convolution layer in a neural network). In this case, it is possible to train the learning algorithm on the CPU, but use the GPU during the test phase. Of course in some cases, it may be desirable to run both training and testing on the GPU. A GPU implementation increases the machine learning processing speed, both for training and testing, by up to an order of magnitude over CPU-only implementations. Because GPU technology is new and evolving faster than the older CPU technology, this ratio is increasing.

More specifically, as shown in FIG. 2, the computing device 110 contains a machine learning GPU execution engine 200. The computing device further contains the CPU 120 and the CPU memory 130. The CPU is in communication with the video interface 190 through an accelerated bus 210. Preferably, this bus 210 is an Accelerated Graphics Port (AGP) or the newer PCI Express, which are designed especially for the throughput demand of 3D graphics.

The video interface 190 includes a GPU 220 and a GPU memory 230. The GPU 220 is capable of transferring data to the CPU 120 over the bus 210. The machine learning GPU execution engine 200 is also in communication with the GPU 220 and the GPU memory 230. The machine learning GPU execution engine 200 includes a training module 240 and a testing module 250. The training module 240 is used during the training phase of the machine learning technique and is used to train parameters for the technique using the GPU. The testing (or use) module 250 is used to compute a given function of the trained parameters and input. The results of the computation are transferred from the machine learning GPU execution engine 200 to the CPU 120 for use in interactive use applications, such as speech recognition.

IV. System Components

Figure 3:
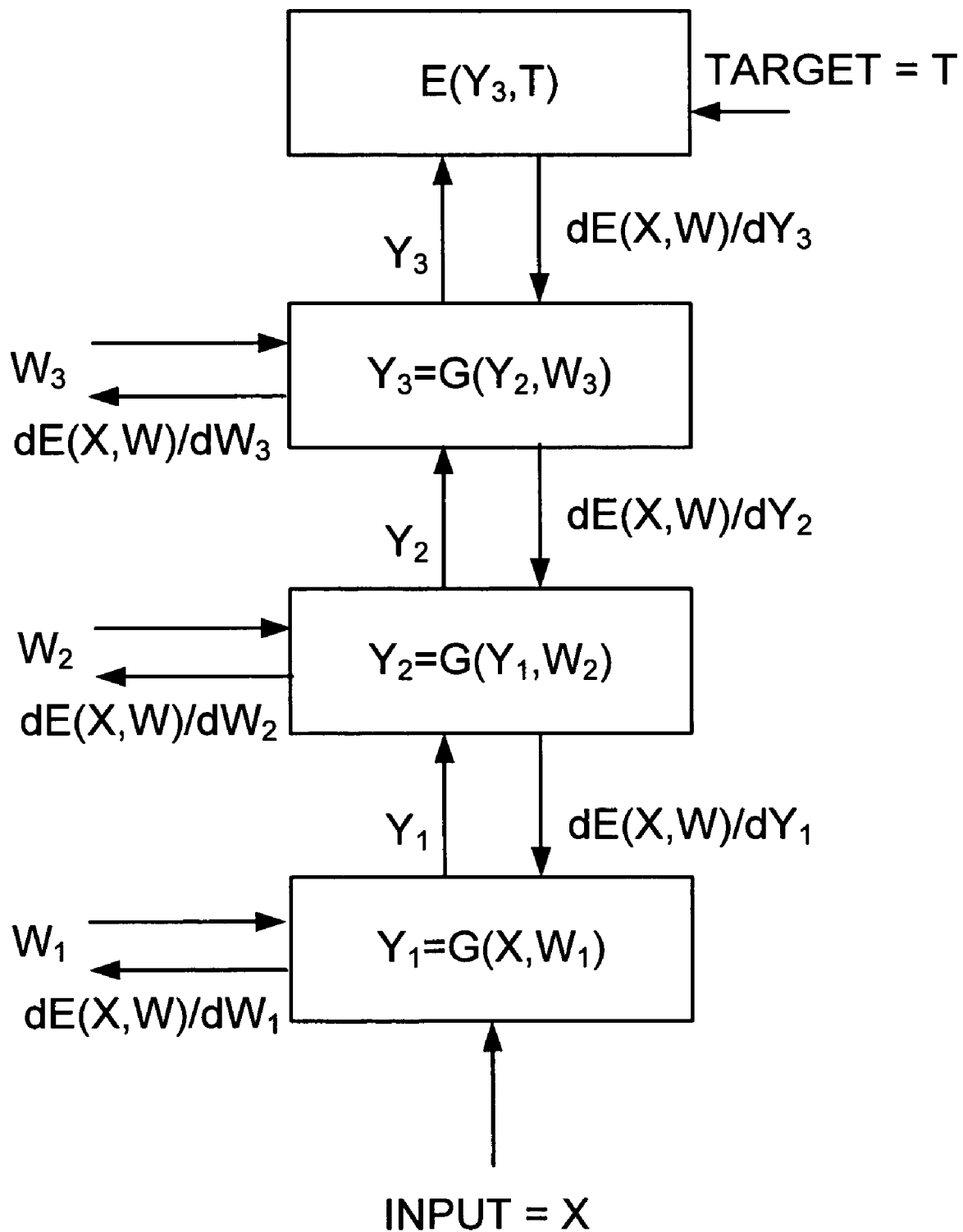
FIG. 3 is a block/flow diagram illustrating the training module of a 3-layer learning machine using, as an example, a gradient descent algorithm.

FIG. 3 is a block/flow diagram illustrating the training module of a 3-layer learning machine using, as an example, a gradient descent algorithm. FIG. 3 is given as an example only and is not meant to restrict the invention to gradient descent algorithms. In this example, the learning machine optimization is performed by using gradient descent. In other machine learning techniques, probabilities may be propagated instead of gradients, such as in Bayesian networks and graphical models. The number or arrangement of the layers are also not restrictive, and that the invention could have more layers, fewer layers or a different arrangement (non-serial) of layers. The parameters are denoted $W=(W_1, W_2, W_3)$. The input of the whole module is X and the output is $Y=Y_3$.

Figure 4:
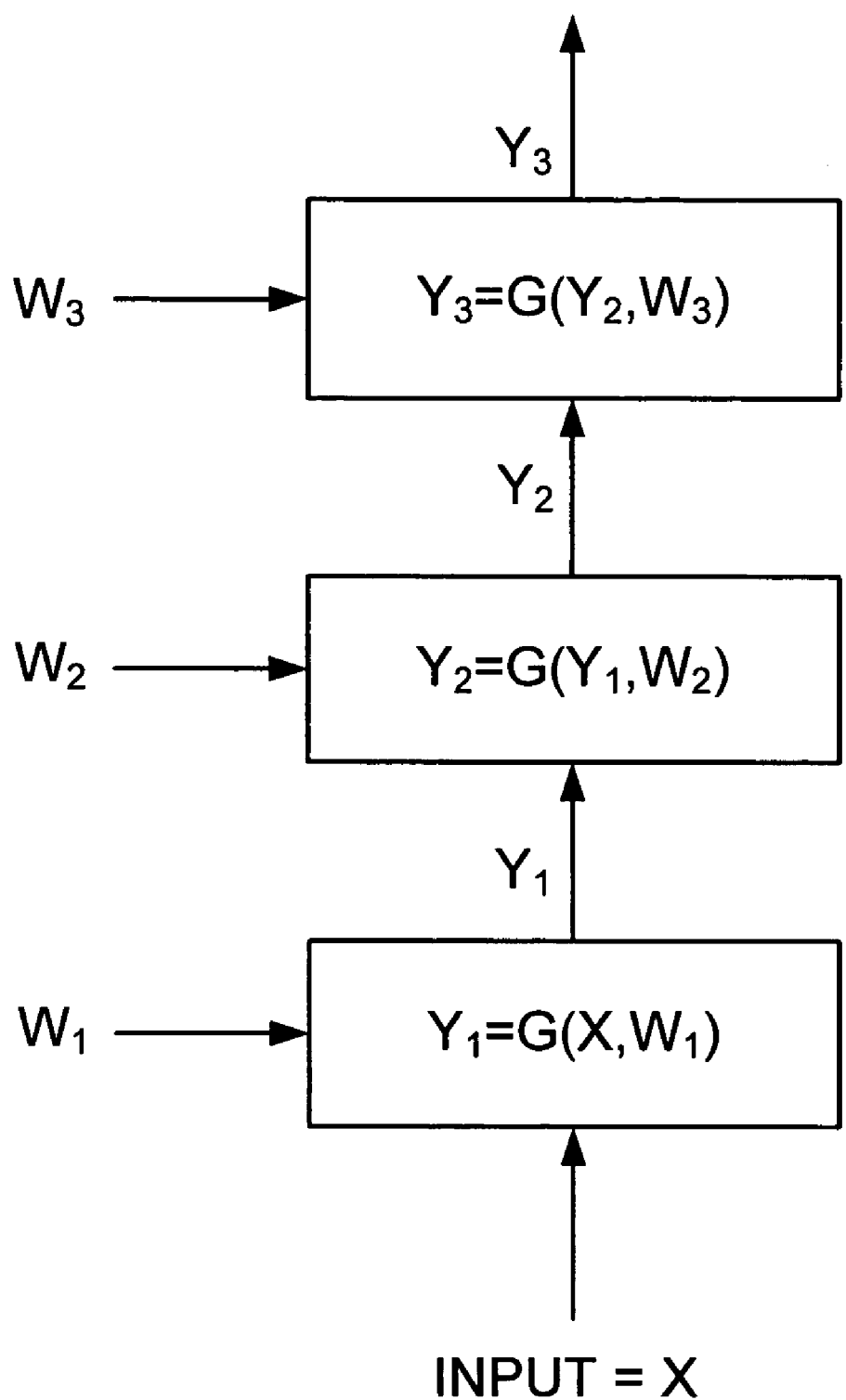
FIG. 4 is a block/flow diagram illustrating the testing module of a 3-layer learning machine shown in FIG. 3.

Each layer computes a function G of its inputs, Y, X or W. Note that from the layer's function's perspective, W or Y are symmetric and indistinguishable. This means that $W_1$, $W_2$, $W_3$, could themselves be computed by other layers. G could also have more input than Y and W. Each layer communicates with neighbors by computing a function of its input (forward pass), and by propagating the derivative of its output, which is obtained by multiplying the output gradient, denoted dE/dY by its Jacobian's transpose. This is the backward pass. By definition, the Jacobian J of G is a matrix $J_{ki}=dY_k/dX_i$ where k indexes the k-th output, and i indexes the i-th input of function G. The error function E compares the output of the last layer to a target T using a cost function. Examples of different cost functions can be mean squared error (MSE), cross-entropy (CE), or others. The cost function provided the gradients, or how much each variable affects the cost and in which direction, for each variable. This gradient is computed for each variable and parameters in the system. The parameters W are updated in order to decrease the cost function. FIG. 4 is a block/flow diagram illustrating the testing module of a 3-layer learning machine shown in FIG. 3.

V. Operational Overview

The machine learning GPU execution engine 200 disclosed herein uses the machine learning GPU execution method to enable processing of machine learning techniques by the GPU. In general, the method can be divided into a training phase, for training the machine learning technique using the GPU, and a testing phase, for using the trained function to solve applied problems. Each of these phases will now be discussed.

Training Phase

Figure 5:
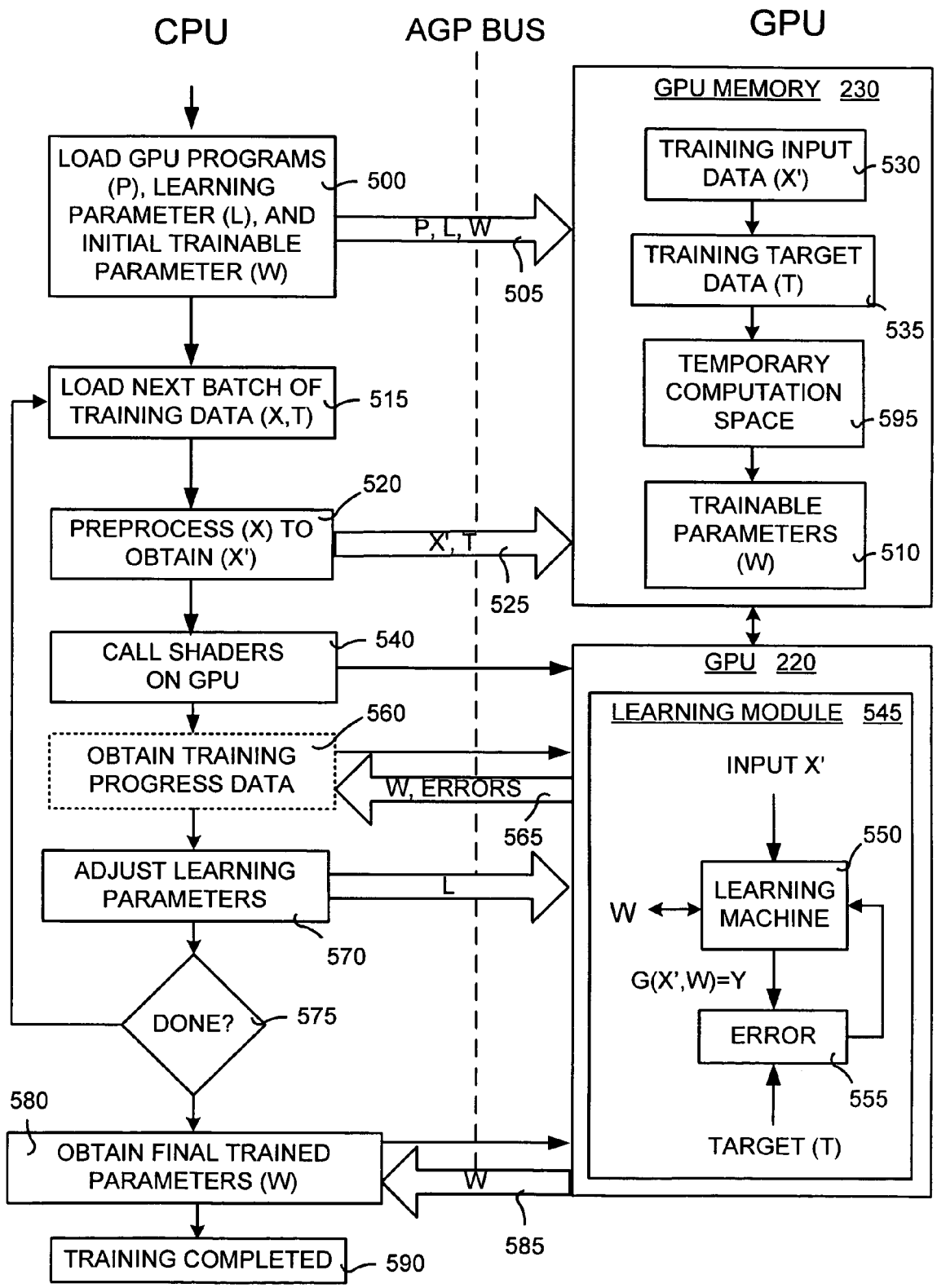
FIG. 5 is a flow diagram illustrating an overview of the operation of the training phase of the machine learning GPU execution method.

In the training phase, the machine learning GPU execution method is used to train learnable parameters of a machine learning technique. FIG. 5 is a flow diagram illustrating an overview of the operation of the training phase of the machine learning GPU execution method. FIG. 5 represents the data flow and control structure of a training session performed on the GPU. Note that the figure is not specific to any type of machine learning technique. Many types of machine learning techniques (such as SVM, K-means, Learning Vector Quantization (LVQ), Expectation Maximization (EM), etc.) can use this architecture. The preceding machine learning techniques are well known in the art and will not be discussed in detail. As shown in FIG. 5, the CPU gives instruction to the GPU and blocks until the GPU completes these instructions. Alternatively, it is also possible to have the CPU and GPU compute at the same time.

Referring to FIG. 5, the training phase of the machine learning GPU execution method begins by loading shaders programs (P), initial trainable parameters (W), such as weights, and other learning parameters (L) (box 500). This data then is transferred from the CPU to the GPU (arrow 505). Data transfer from the CPU to the GPU is relatively expensive, so the CPU pre-loads as much as possible onto the GPU before entering a training loop. The trainable parameters (W) are stored in the GPU memory 230 (box 510). In a preferred implementation, the learning parameters (L) are the weights of each of the neural network layers and the threshold of each unit. The learning parameter (L) is a single scalar called the learning rate. The shaders programs (P) are for the different types of shaders used for the forward and backward propagation and for the weight updates.

The CPU then starts to loop on the training data and accumulates groups of training data by loading batches of training data (X,T) (box 515). The (X) represents the pixels images and the (T) represents their target labels. The reason groups (or batches) are used is that there is a cost of initiating a data transfer between the CPU and the GPU. Transferring the data by groups of several patterns at a time is more efficient.

The pixels images (X) then are preprocessed such that (X) is transformed into (X') (box 520). Next, (X') and (T) are sent to the GPU (arrow 525). The training data (X') then is stored on the GPU memory 230 (box 530) along with the training target data (T) (box 535). The preprocessing can have many different functions such as normalizing the data to put it in better form, extracting intelligent or complex features, and generating distortions to enrich the data set, to name a few. In theory, the preprocessing could be done either on the GPU or the CPU. In practice, however, it is much easier to program on the CPU than the GPU. This means that if the preprocessing is computationally inexpensive, it is much easier to run it on the CPU. In some cases, certain operations may not be easily, efficiently, or at all implementable on the GPU, and must therefore run on the CPU. In some cases, the preprocessing may be different in the training and testing phases. For example during training, one can generate artificial data (translation, rotation, etc) from the original data. This process is known to improve generalization at testing time.

It should be noted that it is possible to include trainable parameters in the preprocessing. This is true even if the trainable parameters are part of the global optimization and trained in conjunction with the learning parameters that reside on the GPU. The difficulty arises, however, in that information (e.g. error gradients, negative feedback, etc) must be communicated from the GPU back to the CPU to update those parameters that reside on the CPU, possibly after each pattern, so that the next pattern can profit from the updated pre-processing. Currently, dataflow from the GPU to the CPU is not optimized since graphic cards are typically designed to send data to the screen but not back to the CPU. As a result, with current architectures, it is preferable to keep all the trainable parameters on the GPU. Preferably, all other data is kept on the CPU and the processing is performed on the GPU. Alternatively, the trainable parameters can reside on both the CPU and the GPU.

Once the training data (X') has been loaded on the GPU, the CPU instructs the GPU to run the various shaders need to process the machine learning technique (box 540). A typical machine learning technique is represented by the learning module 545 located on the GPU 220. The learning module 545 includes a learning machine 550 that computes a function G(X',W) as a function of the preprocessed input (X') and the trainable parameters (W). The goal is to make this output as close as possible as the target value (T). An error 555 between G(X',W) and (T) is computed, and error signals (such as gradient with respect to W) are sent back to the learning machine 550. The weights (W) then are updated in order to reduce the error between G(X',W) and (T).

By way of example, when training two-layer neural networks, the forward and backpropagation correspond to about twenty different shaders (some of which are called multiple times). The number and complexity of shaders can, of course, vary depending on the algorithm used. The shaders are called for each pattern in a group (such as 500 times in some cases). For stochastic gradient descent, the learning parameters are updated after processing each pattern in the group. For batch gradient descent, the learning parameter gradients are accumulated over several patterns before the learning parameters are updated. Whether to use stochastic or batch gradient descent depends heavily on the application and the learning algorithm. For some learning algorithms, such as SVM, the question does not arise. For handwriting recognition and neural networks the stochastic gradient descent machine learning technique is a preferred machine learning technique.

The next two processes may be added for generality, so that the CPU can get feedback from the GPU inside the training loop. For instance, as shown in FIG. 5, the CPU can collect training statistics and obtain training progress data (box 560). The is achieved by having the GPU send the CPU the updated trainable parameters (W) and the errors (arrow 565). This process is optional, as indicted in FIG. 5 by the dashed line box. The training progress data can be used to adjust the learning parameters or even the frequency of presentation of certain kinds of patterns (box 570). For example, with neural networks, it is sometimes desirable to decrease the learning rate as the learning progresses. In another class of algorithm called "boosting", the frequency of certain patterns, or their learning influence, can be changed as a function of the errors made by the system.

Trainable parameters in the preprocessing can also be modified as a function of error signals from the GPU. This is accomplished by allowing error signals to flow back to the CPU and update the learning parameters on the CPU. The group size can be modified accordingly. In the extreme, the group size is 1, which means that the training parameters on the CPU are updated after each presentation to the GPU, as soon as the error signal comes back from the GPU, as previously mentioned in the preprocessing section.

A determination is then made as to whether the training is completed (box 575). This can be determined when all of the batches of training data have been processed, after a fixed number of iterations, or when a desired error threshold has been achieved. If the training is not completed, then the training loop begins anew with the loading of the data (box 515). Otherwise, the final trained parameters (W) are obtained (box 580). This is achieved by the GPU transferring the parameters (W) to the CPU (arrow 585). The training then is completed (box 590).

Testing Phase

Figure 6:
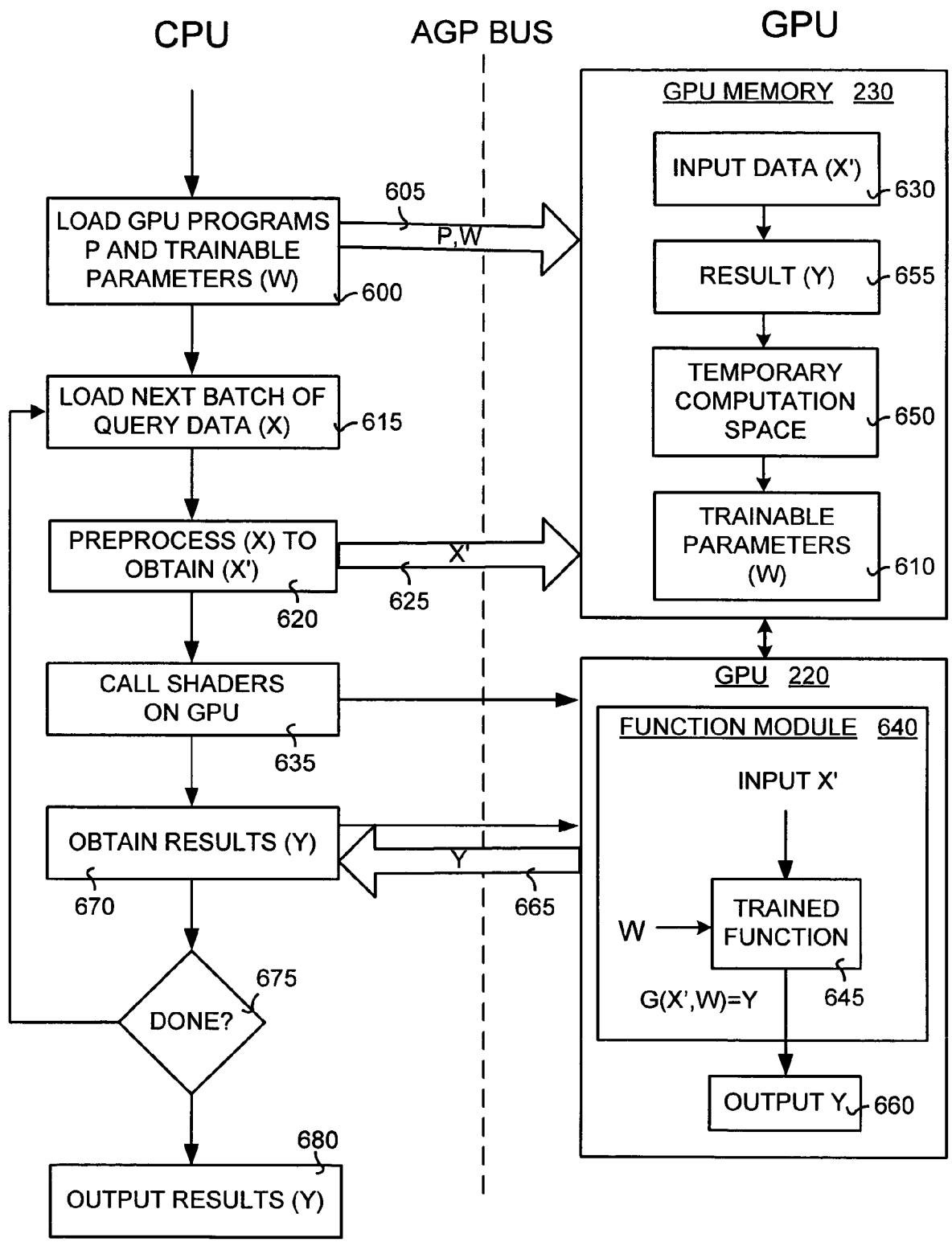
FIG. 6 is a flow diagram illustrating an overview of the operation of the testing phase of the machine learning GPU execution method.

In the testing phase, the machine learning GPU execution method is used to compute functions of input and trainable parameters. FIG. 6 is a flow diagram illustrating an overview of the operation of the testing phase of the machine learning GPU execution method. As shown in FIG. 6, the machine learning GPU execution method computes a given function G of some trainable parameters W and input X. It should be noted that the trainable parameters may have been computed using a GPU, a CPU, or by any other means. Moreover, the trainable parameters may or may not be the result of training. In this respect, FIG. 6 is independent of the training of the trainable parameters shown in FIG. 5.

In FIG. 6, an architecture similar to the architecture in FIG. 5 is used. Specifically, the architecture in FIGS. 5 and 6 share the data structure and shaders programs P. One important difference, however, is that the backpropagation shaders are no longer needed since training is already completed. The testing phase of the machine learning GPU execution method begins by loading the shaders programs P and trainable parameters W onto the GPU (box 600). As in the training phase, the testing phase seeks to download and pre-compute as much as possible outside the recognition/usage loop. The shaders programs P and trainable parameters W then are sent to the GPU (arrow 605). Specifically, the shaders programs P are sent to the GPU 220 to perform processing and the trainable parameters W 610 are stored in the GPU memory 230.

Next, a group of patterns X on which the function G is computed is collected and loaded (box 615). There is a cost for initializing a communication between the CPU and GPU, so by performing grouping, this cost can be amortized over several patterns. The patterns X then are preprocessed to X' before sending them from the CPU to the GPU (box 620). The X' then is sent to the GPU (arrow 625). The input data X' 630 is stored in the GPU memory 230.

Preprocessing can be done either on the CPU or the GPU. Preferably, however, the preprocessing is performed on the CPU as long as it is not too computationally expensive. Preprocessing is useful for features such as normalization and extracting important information and features from the data. After preprocessing, the patterns X' are sent as a group to the GPU (arrow 625).

Next, the CPU instructs the GPU to use the shaders programs P (box 635). A function module 640, which resides on the GPU, contains a trained function 645. The trained function 645 along with the shaders programs is used to compute the function Y=G(X',W). A temporary computation space 650 in the GPU memory 230 can be used to aid in this computation. From this computation, results Y 655 for each of the patterns of the group are accumulated in the GPU memory 230 and sent as output of the function module (box 660). The results Y then are transferred back to the CPU (arrow 665) and the results Y are obtained on the CPU (box 670). Again, transfer from GPU to CPU is quite expensive, so there is an advantage to grouping and keeping the size of Y to a minimum. In the handwriting classification example, Y is just the class of the image X, and therefore is quite small. A determination is made as to whether there are additional batches of query data X (box 675). If so, then the recognition/usage loop begins anew. Otherwise, the results Y are sent as output (box 680).

VI. Operational Details

Machine Learning Problem Description

Figure 7:
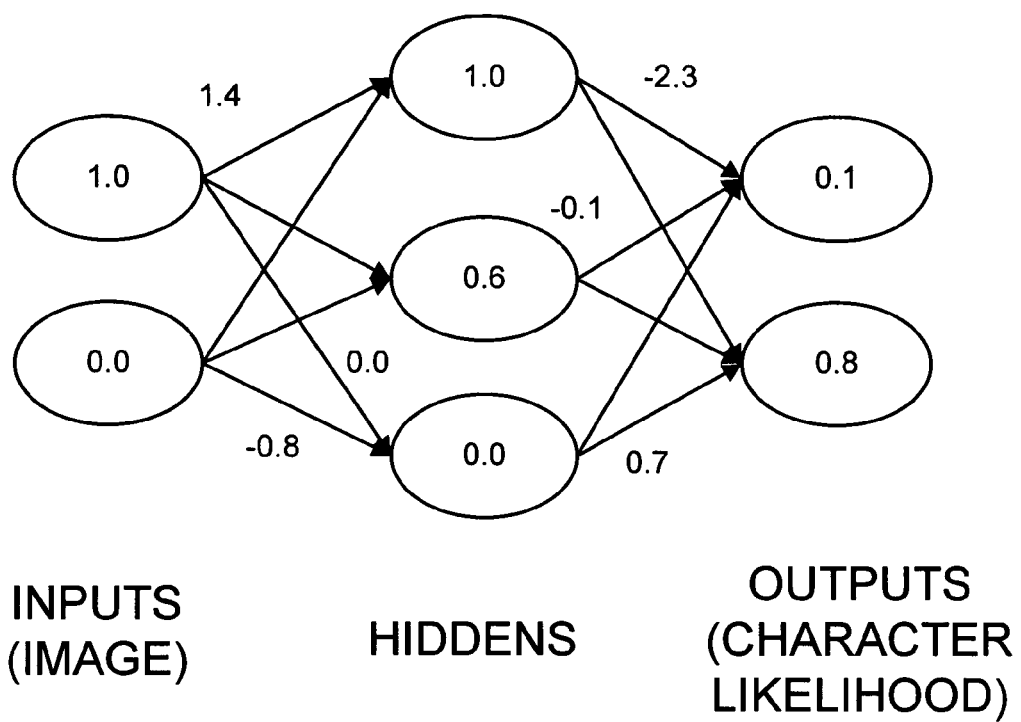
FIG. 7 is a detailed illustration of a pair of layers in a neural network.

A number of machine learning techniques contain, as a kernel, computation that can be cast as very large matrix operations. Of particular interest are large matrix/vector multiplies. By way of example, neural networks used for handwriting recognition typically contain a pair of layers. FIG. 7 is a detailed illustration of a pair of layers in a neural network.

Referring to FIG. 7, calculation of hidden variables is cast as a matrix multiply followed by a mapping step as given in (computation for 1 layer):

$$[w][i] = [o']$$
$$[o] = f([o'])$$

Where f is the sigmoid function $$f(x) = \frac{1}{e^{-x} + 1}.$$

or the tan h function:

$$f(x) = \frac{e^x - e^{-x}}{e^x + e^{-x}}$$

Two such layers are cascaded to produce a result. Vector sizes for inputs, hiddens, and outputs range into the thousands. Although FIG. 7 and the above are based on neural networks, it should be noted that a number of other machine learning problems fit the general model of repetitive operations on large floating point vectors given above.

Primitive Operations on the GPU

Fortunately, many machine learning techniques, such as neural networks, expectation minimization, and many other gradient descent based algorithms are composed of simple primitives (or building blocks). These primitives include:

Inner products (between vectors or matrix and vector)

Outer products (between vectors)

Linear algebra (such as addition, subtraction, multiplication by a scalar on vectors or matrices)

Non-linearity (such as tan h, sigmoid, thresholding) applied to a vector or a matrix Matrix transpose The machine learning GPU execution method implements each of these operations using pixel shaders. In addition, the method allows each of these operations to be used together for training and in a real setting. It should be noted that the method can be used with neural networks or any other learning algorithms made out of the same primitives as described below, or simple extensions thereof.

Using Pixel Shaders for GPU Computations

The machine learning GPU execution method implements all of the operations above using one or more pixel shaders. Pixel shaders are used in the graphics processing pipeline. Pixel shaders are individual programs that are executed on the pixel-rendering hardware. Specifically, the process of turning triangles into pixels is called "rasterization". The hardware takes triangles as input and allows the instructions to render each pixel to be specified by a program, which can be loaded before the triangles are rendered. These programmable triangle renderers are called "pixel shaders". The instructions of the program in the shaders are close to assembly language since they each have a direct hardware implementation. There are competing languages (and hardware) for shaders, such as High Level Shader Language (HLSL), C graphics (Cg) from Nvidia®, and DirectX. The new flexibility introduced by pixel shaders, allows not only naturalistic rendering of surfaces, but also brings the GPU closer to a general purpose parallel processor.

The machine learning GPU execution method uses the GPU as a general purpose parallel processor. In addition, the method uses pixel shaders to implement the various primitive operations used in machine learning techniques. As a result of the parallel specialized GPU hardware, the training and use of these algorithms run an order of magnitude faster on a GPU than on a CPU.

In the Direct3D component of DirectX, there are two elements, called vertex shaders and pixel shaders. DirectX is a set of application program interfaces (APIs) developed by Microsoft® Corporation that lets applications take advantage of hardware acceleration features of the GPU. The current generation of pixel shaders are highly programmable. Both types of shaders are concerned with the rendering of triangles (the building blocks of graphics objects) to an output device. Vertex shaders can be used for tasks like spatial transformation and animation of the vertices of triangles (hence the name). Pixel shaders are used to shade (or calculate the color values of) the individual pixels as a single triangle is rasterized.

A pixel shader is expressed as a series of instructions in DirectX shader assembly language, which is a limited, hardware-independent language defined by DirectX. The code in a shader is executed once for each pixel in a triangle being rendered, and its only effect is to set the values of the 4-vector for that pixel. The limitations of the shader language, and the lack of side effects, mean that the GPU is free to render pixels in any order and using as much parallelism as its hardware can support, resulting in very high performance. The fact that a pixel is a 4-vector affords yet another kind of parallelism; each execution of a pixel shader can calculate four elements (e.g. four adjacent elements of a vector) simultaneously.

Many of the facilities used in assembly language programming can be used within pixel shaders. These includes constants, registers, addition, subtraction, multiplication, reciprocal, a small set of transcendental functions, and so on. However, other familiar constructs such as looping and branching are not generally available. This is because the number of instructions per shader is restricted (96 instructions in one popular GPU) and because a shader cannot modify memory other than the pixel being rendered. These limitations mean that some algorithms are ill-suited for processing by the GPU and, if they can be implemented at all, will run slower on the GPU than the CPU. To evaluate whether a particular machine learning algorithm can be executed on a GPU, each of the individual operations that make up the algorithm need to be examined.

Implementing the Unit Operations

Figure 8:
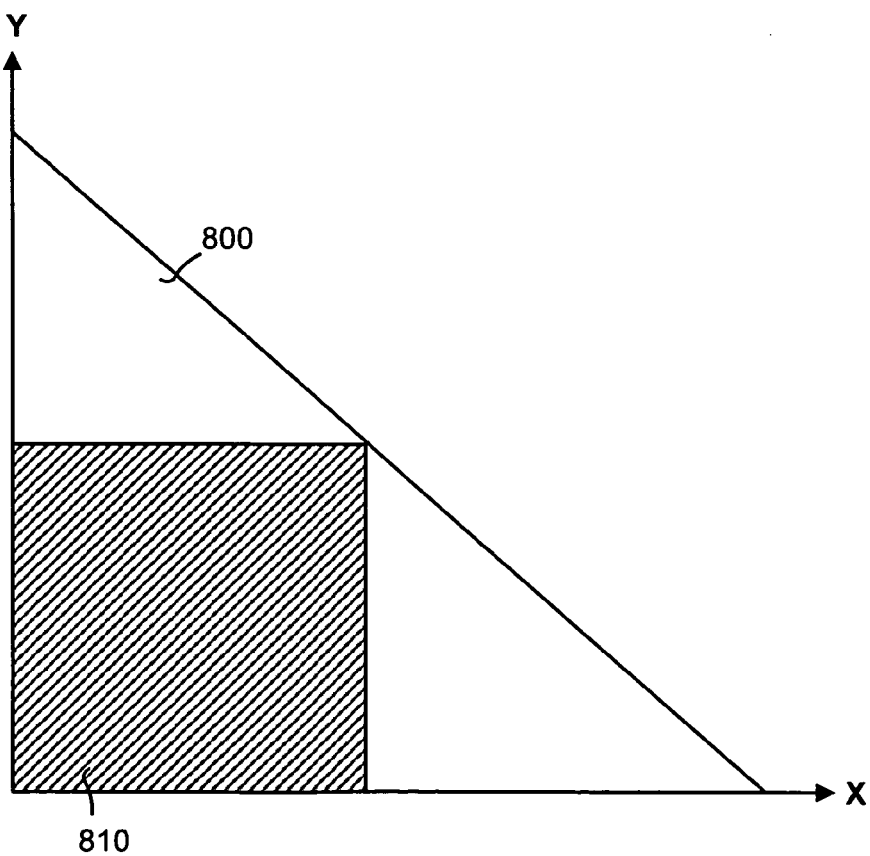
FIG. 8 illustrates the rectangular memory technique used by the machine learning GPU execution method.

The machine learning GPU execution method implements each of the primitive operations bulleted using one or more pixel shaders. The first challenge is to make a shader calculate a result that is a rectangle in GPU memory. In other words, the results must be a 2-dimensional matrix of floating-point values (4-vectors). However, pixel shaders render all pixels in a given triangle. To overcome this problem, the machine learning GPU execution method specifies a rectangular viewport with the triangle. FIG. 8 illustrates the rectangular memory technique used by the machine learning GPU execution method. In particular, FIG. 8 shows a triangle 800 containing pixels being rendered, and the rectangular viewport 810 within the triangle 800. According to the machine learning GPU execution method, the GPU will only calculate pixels within the intersection of the viewport 810 and the triangle 800. Thus, to calculate a desired rectangular region, the region is specified as the viewport 810 and is enclosed within the triangle 800, which becomes the rendering target.

In cases where a vector needs to be rendered instead of a matrix, the same technique applies. The only difference is that a viewport rectangle is specified that is only one pixel tall. Similarly, to render a scalar value, a one-by-one-pixel viewport can be used.

Figure 9:
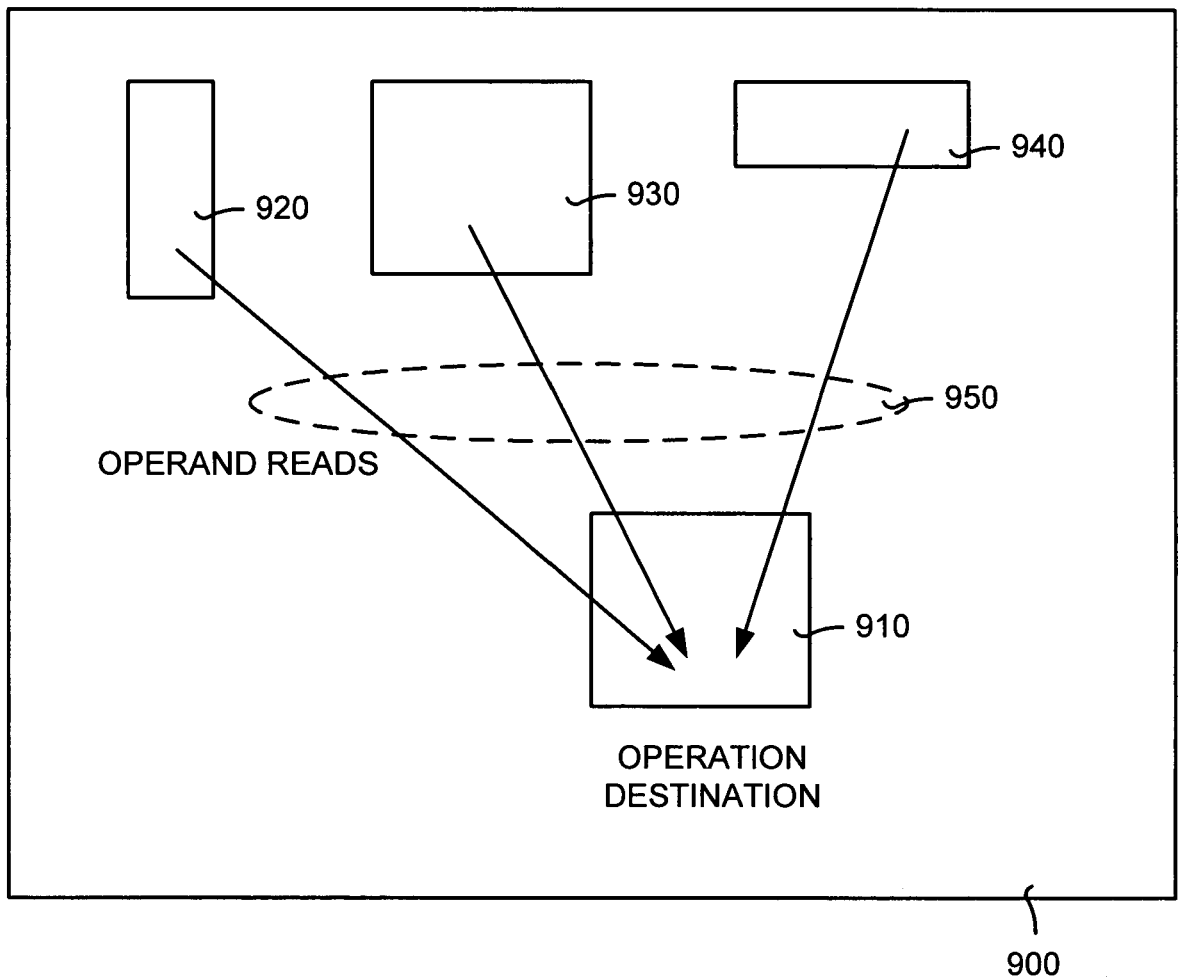
FIG. 9 illustrates a GPU memory organization of the machine learning GPU execution method.

With this technique and the general-purpose programming facilities available within pixel shaders, unary operations like x=F(x) for vectors and arrays can be implemented. For operations that need to read from other operands, the GPU memory organization must be examined. Specifically, DirectX allows a rectangular region of memory to be allocated as a workspace. FIG. 9 illustrates a GPU memory organization of the machine learning GPU execution method. As shown in FIG. 9, a workspace 900 is generated in GPU memory. On current hardware, the workspace can be generated from a minimum allocation of a square region of 2048×2048 pixels (each 4-valued). From this subrectangle 910, shader operations can render and fetch operands from other subrectangles such as $t_1$ 920, $t_2$ 930, and $t_3$ 940. These fetches are achieved through an operand read 950.

The mechanism in DirectX that facilitates this memory organization is texture mapping. Texture mapping arises from the need to put an image onto the surface being rendered. For instance, when rendering the surface of the planet Jupiter, a zebra, or a texture such as a brick wall, one must take into account the pattern drawn on the surface as well as the lighting, angle, reflection, and so forth. For this operation, indices into a rectangular lookup table are bilinearly interpolated across the target area of a rasterized triangle. By treating rectangular areas of the workspace (other than the area being rendered) as textures, they can be mapped onto the destination rectangle. Thus, when calculating a pixel at any x,y location in the destination rectangle, there is access to the values in the geometrically corresponding pixel of the texture rectangle. For example, if a destination rectangle of size a by b pixels is being rendered, another region that is also a by b pixels can be texture-mapped. This will yield direct access, within the shader code, to the source-rectangle values at $a_i$ and $b_i$ that correspond to the $i_{th}$ pixel in the destination. A simple application of this technique allows any matrix, vector or scalar value to be copied to a same-sized matrix, vector or scalar elsewhere in the workspace. Alternatively, a texture region of x pixels by 1 pixel could be mapped to the destination rectangle. This would provide access to a lookup table whose value depends on the x coordinate, but not the y coordinate, of the destination pixel being rendered.

The usefulness of textures can be extended by using arithmetic on register values inside a shader. Registers are local variables which the shader can use to render a given pixel. Their values cannot be shared between pixels (this would break the parallelism assumption) but can be used (locally) for intermediate results. For example, any array or vector can be transposed while copying its values to a new location. Assume a source rectangle whose left, right, top, and bottom coordinates are l, r, t, and b. Then specify a texture rectangle whose coordinates are t, b, l, and r. Inside the pixel shader, the x and y texture coordinates are swapped before using them to fetch a value from the source and copy it to the destination. At the end of rendering, the destination will contain the transpose of the source.

Figure 10:
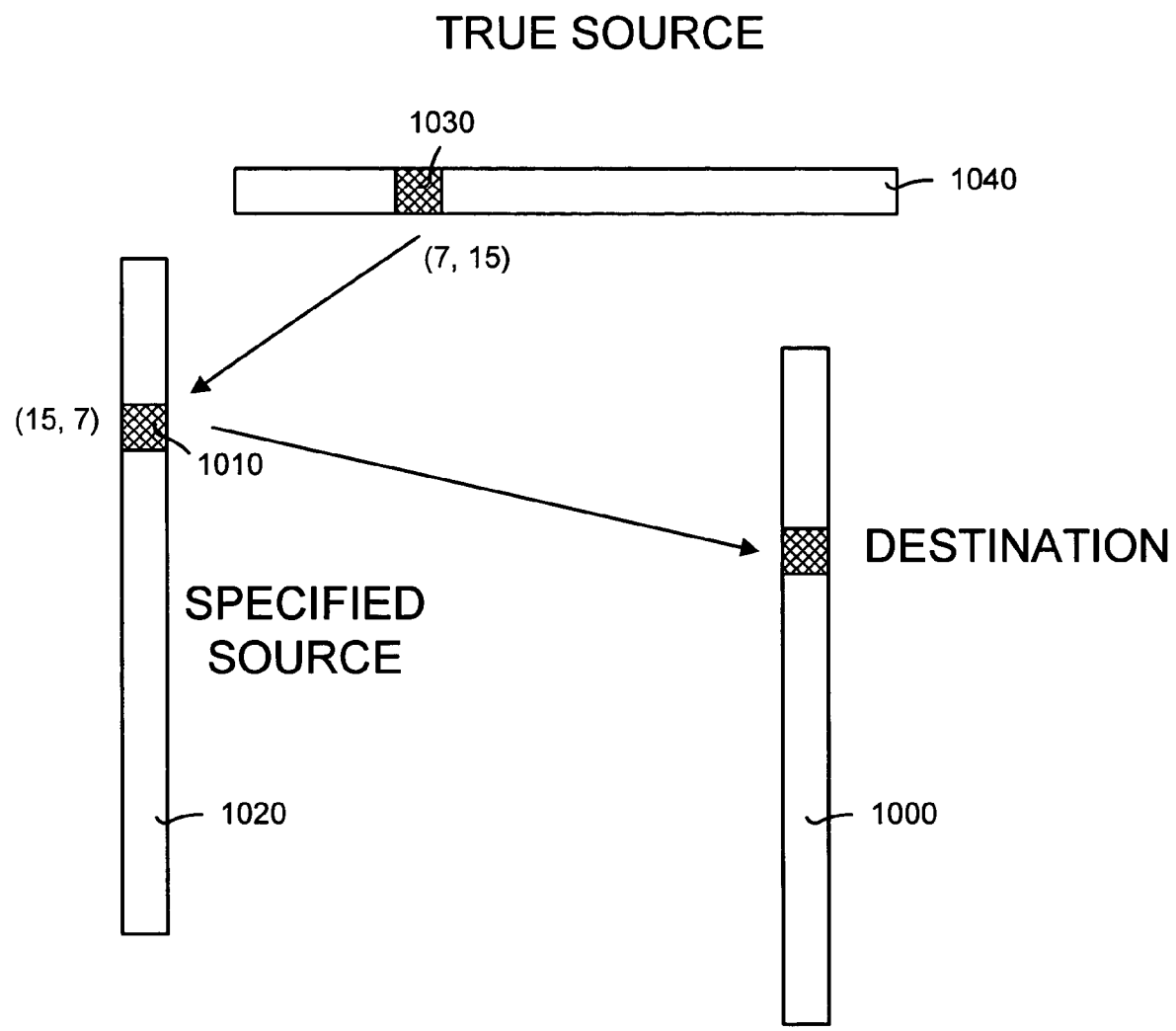
FIG. 10 illustrates the use of texture mapping using a texture triangle.

FIG. 10 illustrates the use of texture mapping using a texture triangle. As shown in FIG. 10, the rendering of a current pixel of a destination 1000 will retrieve texture coordinates (15, 7) from a texture rectangle 1010 in a specified source vector 1020. Before fetching a texture value, the row and column coordinates are reversed so that the value from texture rectangle 1030 having location (7, 15) is actually read, which is located inside the actual true source vector 1040 being transposed.

DirectX allows texture mapping to be used to map more than one source rectangle to the current destination. At least 8 such mappings can be used in each pass in current hardware. With multiple sources, operations such as (vector A-vector B→vector C) can be implemented. At each pixel in C, the texture-mapped values from A and B are fetched, elementary math is performed on register values, and the results are stored.

Texture-mapping from two vectors to a matrix also provides a way to implement an outer product (vector A*vector B→matrix C). Let vector A be a row vector, one pixel wide, and B a column vector, one row tall. Texture-map these degenerate rectangles to the rectangle of matrix C. Then, when rendering the pixel x,y of C, the texture sampling will yield the $Y_{th}$ element of A and the $x_{th}$ element of B, which are just the values needed to multiply and store.

Using the Four Components

Before discussing the implementation of the inner product, each of the unit operations will be discussed in light of the fact that the GPU workspace has 4 components. These components arise because each pixel consists of x, y, z, and w values. The labels x and y here should not be confused with x and y in reference to pixel coordinates in the discussion above. The four components are used conventionally to store coordinates in 4-dimensional object space. The machine learning GPU execution method exploits this feature of the GPU programming model and hardware to perform computations faster. It would be possible to ignore three of the components and do all of the calculation in, say, the x plane, but the resulting simplification of programming would come at a high performance cost.

In order to exploit the components, the mapping of the pixel planes to locations in mathematical arrays or vectors is defined. For vectors, the simplest mapping is as follows:
pixel 0:x→element 0
pixel 0:y→element 1
pixel 0:z→element 2
pixel 0:w→element 3
pixel 1:x→element 4
and so forth.

In order to extend this to matrices, it is observed that each row (or column) of a matrix is a vector. The mapping above is applied to each row (or column). Whether the four components are collapsed into the row dimension, or the column dimension, is a choice that can be made individually for each matrix in a way that simplifies the programming.

Given the mapping from matrix or vector elements to pixels and components, it becomes apparent that copy operations are not affected at all. The shader instructions texld and mov, like many others, operate on one pixel at a time, so they respectively move four values from a texture pixel to a register, and from a register to the destination pixel.

Transpose operations on vectors are also unchanged. The components are always collapsed into the dimension of the vector. In the case of matrices, the code does not change, but it must be noted that the direction of collapse is transposed along with the data.

Mathematical operations can also be adapted. Many shader instructions can be used either on a 4-vector of values or on a single value, with appropriate syntax. For example, exp r1.x, r0.x fetches the x plane of register 0, exponentiates it, and stores the result into the x plane of r1.

The Outer Product

The outer product of two vectors can be accomplished with use of all four components, but another new technique must be introduced. This technique, used by the machine learning GPU execution method, is called the indexer texture technique. Generally, this is a way to select the value in just one of the four components of a vector, which has been mapped to elements as described above.

By way of example, consider vector A is a column vector of size a. Vector B is a row vector of size b. It is desired to compute the outer product, C, a matrix that is a rows tall and b columns wide. C is to have its four components collapsed into the column, or y, dimension. In other words, in terms of pixels, the memory rectangle for C is b columns wide, but only a/4 rows tall (because each pixel row stores 4 matrix rows). It is required that a to be a multiple of 4.

A shader routine is needed that will calculate each pixel of C. The texture mapping is straightforward for A, but for not for B. Access to the ith value (not pixel) of B is needed when computing the ith pixel of C. For instance, in the four components of pixel 0, 0 of C, the following values need to be computed:

$C_{0,0} = A_0 * B_0$
$C_{1,0} = A_1 * B_0$
$C_{2,0} = A_2 * B_0$
$C_{3,0} = A_3 * B_0$

This computation can be done in one GPU mul (multiply) instruction. This requires somehow placing the value $B_0$ into the w plane of a register (such as store $A_0$–$A_3$ in r2 and $B_0$ in the w component of r3). Then:

mul r1, r2, r3.wwww

Working back another step, if there was a "bitmask" that would single out $B_0$ from its intra-pixel neighbors $B_1$–$B_3$, the dp4 (dot product) instruction could be used to extract the value into the w component of r3. Suppose r5 contains (1, 0, 0, 0) and r4 contains $B_0$–$B_3$ (loaded by the texture mapping for B). Then this instruction will calculate (r4.x*1+r4.y*0+ r4.z*0+r4.w*0), which equals r4.x, or $B_0$:

dp4 r3.w, r4, r5

The inner product can be calculated if the value (1, 0, 0, 0) is available when column 0 of matrix C; (0, 1, 0, 0) is rendered, when column 1; (0, 0, 1, 0) is rendered, when column 2 is rendered, and so forth. This is the purpose of the indexer texture technique. The indexer texture technique uses a very small texture that is 4 pixels wide and 1 pixel tall, and is initialized to the following values:

| 1 | 0 | 0 | 0 |
|---|---|---|---|
| 0 | 1 | 0 | 0 |
| 0 | 0 | 1 | 0 |
| 0 | 0 | 0 | 1 |

These four pixel values comprise all the "bitmasks" needed to extract individual values from vector B using the technique just described. All that remains is to find a way to make the correct pixel of the indexer texture technique available in each invocation of the shader. In order to accomplish this task, the machine learning GPU execution method uses yet another application of texture mapping.

Up this point, texture mapping has been used in a way that preserves a one-to-one mapping between texture pixels and destination pixels. This was done by defining texture-coordinate rectangles and destination rectangles that contain the same number of pixels. For the indexer texture technique, a texture-coordinate rectangle is defined that is a multiple of the size of the indexer texture itself (which is, by definition, 1.0 by 1.0 texture-coordinate units) as follows. If the width of matrix C is w pixels, a texture-coordinate rectangle is specified for the indexer texture whose width is w/4 (which must be a whole number). As the shader is called at each pixel across the width of C, the indexer texture coordinate will range from 0 to w/4. In other words, as every 4 pixels of C are traversed, the indexer coordinate will change from one whole-number value to the next. If the fractional part of the texture coordinate is considered, for every 4 pixels of C this will range from zero to one. These are exactly the values needed to sample the indexer texture in order to get the correct "bitmask" at each pixel of C:

```
frc r3, t3       // load fractional part of indexer texture
                 // coordinates into register 3
texld r4, r3, s1 // use the texture coordinates in register 3 to
                 // sample the indexer texture
```

Using the above techniques, a pixel shader that will compute the outer product of two vectors is created.

The Inner Product

The inner product is an operation that can be represented as (matrix A*vector B→vector C). The inner product presents a problem because it requires that a sum be accumulated while looping over several values. This goes against the shader architecture, which assumes there is no communication between adjacent pixels. For this reason, an inner product cannot be implemented as a single pixel shader. However, as shown below, the inner product can be implemented by using a series of shaders and some additional memory.

Matrix A, of size a rows by b columns, is multiplied by vector B, a row vector of size a. Note that B would customarily be represented as a column vector, but using a row vector simplifies the GPU computation. Recall that making transposed copies of vectors can be achieved using the machine learning GPU execution method, so this is not an obstacle. The result, C, will be a column vector of height b. It is assumed that matrix A is organized with its 4 components per pixel collapsed into the y (row) dimension as before.

Figure 11:
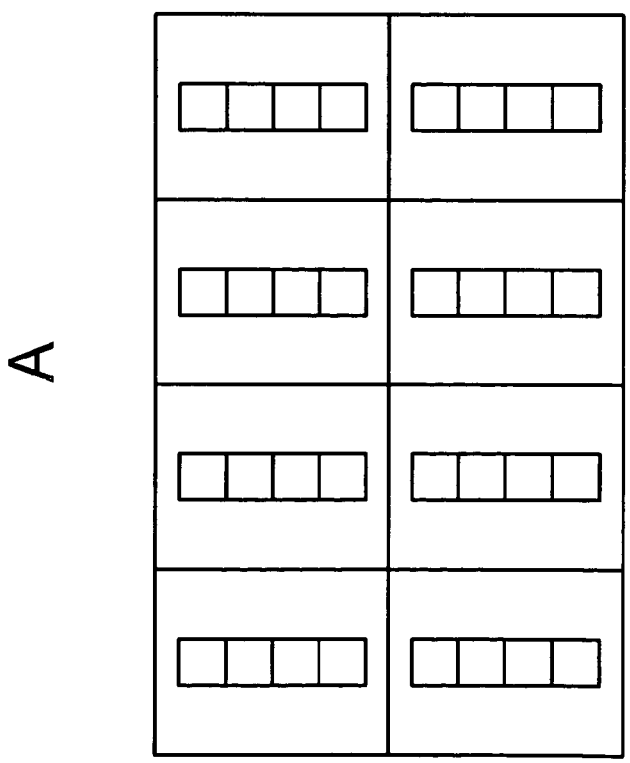
FIG. 11 is a block diagram illustrating the inner product.

FIG. 11 is a block diagram illustrating the inner product. The corresponding equations for FIG. 11 are as follows:

$$C_0 = A_{0,0}*B_0 + A_{0,1}*B_1 + A_{0,2}*B_2 + A_{0,3}*B_3$$

$$C_1 = A_{1,0}*B_0 + A_{1,1}*B_1 + A_{1,2}*B_2 + A_{1,3}*B_3$$

and so forth.

Note the render target, C, is one-dimensional. This defeats the previous approaches, because any texture maps that are defined can only have one value each at any given pixel in C. However, each value in C depends on all the values in B and in one row of A. Thus, another approach must be used to access multiple values from A and B in the shader. This approach first uses multiple texture maps (8 is a reasonable number with current hardware) to efficiently read multiple operands. Second, address arithmetic is used within the shader to read additional operands.

Even with these techniques, a large inner product cannot be calculated in a single rendering pass. This is because pixel shaders cannot use branching or looping, and can contain only a limited number of assembly instructions (such as 96 in one current implementation). Thus, each shader can only do a certain amount of computation before the instruction limit is reached. Fortunately, the inner product can be decomposed into a set of subproblems by restricting the number of columns of A that are consider at a time. This will produce a set of column-vector partial products. These partial products then can be reduced iteratively until obtaining a single column vector containing the inner product result.

The decomposing technique is as follows. First, a shader is created that will multiply a 12-column submatrix of A by a 12-column subvector of B. Eight texture maps are available, and 6 are allocated to A and 2 are allocated to B. The 6 maps for A will all have the same-sized source rectangle, but at six different horizontal offsets, from 0 to 5 pixels. This will yield direct access to the first 6 columns of the matrix (recalling that 1 pixel equals 1 column in the horizontal direction). The two maps for B will also be offset by 1 pixel, giving direct access to the first 8 columns of B (where 1 pixel equals 4 columns).

The shader procedure is run for the 12-column partial product with a destination rectangle that uses temporary (scratch) memory in the GPU. The shader procedure, which calculates four rows (one pixel) of C at a time, is as follows:

a) Use the texId (texture load) instruction 4 times, with 4 texture maps offset from one another horizontally by one pixel, to load the first four pixels of A into registers. Each pixel contains four row values. Use another texId to load one pixel (4 columns) of B.

b) Use mul to store the first 4 products into register 0. This calculates, for the first pixel rendered, $A_{0,0}*B_0$, $A_{1,0}*B_0$, $A_{2,0}*B_0$, and $A_{3,0}*B_0$. The notation xxxx means to use the x component of register 1 (namely $B_0$) for all four products:

mul r0, r1.xxxx, r2 c) Use mad (multiply/add) to accumulate the next 4 products into register 0. This accesses the second horizontal pixel of A (via r3), and adds, to the previous results, the products $A_{0,1}*B_1$, $A_{1,1}*B_1$, $A_{2,1}*B_1$, and $A_{3,1}*B_1$. We use yyyy to access $B_1$:

mad r0, r1.yyyy, r3, r0 d) Use mad twice more in the same way to accumulate the next 8 products:

mad r0, r1.zzzz, r4, r0 mad r0, r1.wwww, r5, r0 e) Now, prepare for the fifth through eighth columns (column numbers 4–7). Columns 4 and 5 are already accessible by the remaining two texture maps of the 6 that were allocated to A. For columns 6 and 7, take the coordinates for column 6, and twice add the constant c0, which have been set to equal one pixel (or $1/2048^{th}$ of the workspace's width). These coordinates are stored for columns 6 and 7 in additional registers. Then, four texId instructions are used to store these values, namely $A_{0,4}$ through $A_{3,7}$, in registers.

f) Using the second texture map that was allocated for B, which was offset by 1 pixel, values for $B_4$ through $B_7$ (one pixel's worth) are loaded.

g) Four mad instructions are used to accumulate 16 more products into the four running totals stored in r0, as was done in steps (b) through (d).

h) Now, preparations are made for the last four columns of the partial product. At this point, all the texture maps have been used. Thus, the address of column 7 is obtained, which is still in a register, and C0 is successively added to this value four times. The results are stored in registers. The same procedure is performed to add C0 to the register containing the address of the second pixel of B. This includes advancing it one pixel so as to access $B_8$ through $B_{11}$. Once the correct coordinates are in registers, texId is used again to load the values for $A_{0,8}$ through $A_{3,11}$ and $B_8$ through $B_{11}$ into other registers.

i) Four more mad instructions are used to accumulate the last 16 products into r0. Now r0 contains the values for elements C0 through C3 of the 12-column partial inner product. The shader routine then is complete. The reason that more columns are not processed in this shader is that the per-shader instruction limit would be reached.

The above is a method for calculating a 12-column partial inner product into a column vector in temporary memory. This method can be extended to matrices wider than 12 columns as follows. First, the 12-column partial products are processed as long as the remaining width is 12 or more.

Next, the results of these passes directly adjacent to the first partial result are located in a continuous block of temporary memory. Finally, if there are either 8 or 4 columns remaining (recall that the matrix width must be a multiple of 4), a modified shader is used that is written to accommodate either 8 or 4 columns. The techniques for these are simplifications of the 12-column shader.

This results in a block of one or more adjacent column vectors representing partial results. These need to be "reduced", that is, to sum them into a single column vector which will contain the final inner product (and which will be located in a definite location where it can be accessed by other routines, instead of in "scratch" memory). For efficiency, texture maps are used (as opposed to address calculations in registers) to access the partial results needing to be reduced. Using the 8 texture maps as sources, as many as 8 partial results can be reduced at a time. The shader code for this is very straightforward, consisting of texId and add instructions. One way to simplify the process is by the choice of location for reduced, but not final, results. Namely, the reduced results can be put in the next column to the right of the existing partial results. This way, until the very last reduction step, the set of partial results to be reduced is always a contiguous rectangle. With these techniques and sufficient temporary memory, an inner product of arbitrary size can be computed.

The above has shown that the machine learning GPU execution method contains all the operations needed for training neural nets (and any other machine learning algorithm made up of the same operations). Further, these operations can be implemented as pixel shaders on a GPU, and in all cases the algorithms lend themselves to a high degree of parallelism.

VII. WORKING EXAMPLE

In order to more fully understand the machine learning GPU execution system and method disclosed herein, the operational details of an exemplary working example are presented. It should be noted that this working example is only one way in which the machine learning GPU execution system and method may be implemented.

In this working example, the machine learning GPU execution system and method was run on a single processor 2.8 GHz Pentium 4 with an ATI® Radeon 9800 graphics card. The 9800 graphics card has 94 locations of instruction memory and 256 MB of working space, 16 MB of which we use for our read/write workspace, the remaining is used for read only data. The CPU-only reference implementations are already optimized to take advantage of the SSE SIMD extensions of the Pentium 4, so the comparisons are SIMD-to-SIMD. Still the GPU acceleration is nearly an order of magnitude for the examples tested.

This working example illustrates the machine learning GPU execution system and method used to perform handwritten character recognition. The task was to find the class ('0' to '9') of a pixel image of a handwritten digit. The training database was made up of 60,000 training images, with their correct labels. This training set is sometimes referred to as MNIST and is available on the web, and is well-known in the machine learning algorithm literature. To solve this task, a neural network approach was used. In particular, the neural network was a 2-layer fully connected neural network.

The training of the two-layer fully-connected neural network by backpropagation was decomposed into the following passes:

| | |
|---|---|
| Forward Propagation | $W_1 I = H' \xrightarrow{F_1(x)} H$ |
| Forward Propagation | $W_2 H = O' \xrightarrow{F_2(x)} O$ |
| Compute Error | $\Delta_2 = \alpha(\text{target} - O) * D_2(O)$ |
| Update Weights | $W_2 \mathrel{+}= (\Delta_2 \otimes H)$ |
| Propagate Error | $\Delta_1 = (W_2^T \Delta_2) * D_1(H)$ |
| Update Weights | $W_1 \mathrel{+}= (\Delta_1 \otimes I)$ |

Here, the forward propagation is a matrix $W_1$ times a vector I followed by a function map ($F_1(x)$. In this case, $F_1(x)$=tan h) to compute the vectors H. Because there are 2 layers in this neural network, the same operations are repeated with $W_2$, H, and $F_2(x)$ (in this case $F_2(x)$=sigmoid), to yield O. More layers could be implemented in a similar fashion. $W_1$, $W_2$ are the matrix of weights for each level of the neural net, I is the input vector, H is the hidden layer vector, and O is the output vector. A threshold is also typically added to each unit hidden and output units. The threshold can be emulated by adding a unit, whose value is always 1, to the input and hidden layer. The weights connecting the constant unit to the other units are effectively the thresholds for those units. If layers I and H are augmented by the constant units, the equations above correctly implement thresholds for each hidden and output layer. The threshold parameters are embedded in $W_1$, and $W_2$. The error computation is the difference from the target vector and the output vector from the neural network multiplied by derivative of the F(x) function, D(x). Formulae for F(x) and the corresponding D(x) are as follows:

| | Function | Derivative | |
|---|---|---|---|
| Sigmoid | $F(x) = \dfrac{1}{1 + e^{-x}}$ | $D(x) \dfrac{e^{-x}}{(1 + e^{-x})^2}$ | $= F(x) * (1 - F(x))$ |
| Tanh | $F(x) = \dfrac{e^x - e^{-x}}{e^x + e^{-x}}$ | $D(x) = \dfrac{4}{(e^x + e^{-x})^2}$ | $= (1 + F(x)) * (1 - F(x))$ |

Note that the shader language has exponential functions, which can be applied component by component to a vector, or from the shader's perspective, pixel by pixel.

The weight update was performed by performing an outer product of the error vector and the input vector of the layer. The resulting matrix was scaled by the learning coefficient, $\alpha$, and added into the existing weight matrix. To propagate the error up the network, another matrix vector multiply was computed. Namely, the transpose of the weight matrix with the error vector was computed, again scaled by the D(x) function.

To summarize, the following operations were implemented on the GPU using the machine learning GPU execution method:

1. matrix*vector→vector (inner product)
2. x=f(x) for each element of a vector (where f is either tan h or the logistic function, or their derivatives)

3. vector A−vector B→vector C
4. vector*vector→matrix (outer product)
5. matrix A+constant*matrix B→matrix A
6. matrix transpose
7. copy (matrix or vector) to a new location within GPU memory
8. copy (matrix or vector) from CPU memory to GPU memory, or vice-versa (this is directly supported by DirectX, and mentioned only for completeness).

Each of these operations is performed done in a pass, sometimes multiple passes when the limitation discussed above prevent us from computing the operation in a single pass. Actual execution in the GPU requires that the list of passes be created in a preprocess. This list can be created manually or automatically. Moreover, the individual functions must be compiled and downloaded to the GPU (also in the preprocess), the input and training values must be downloaded to the working space in graphics memory, and then the triangle and viewport must be downloaded and the function specified for each pass. Each of these steps was implemented through calls to the Direct 3D (D3D) graphics API. Note that downloading the triangle and viewport initiates execution of a pass. As noted above, rendering the clipped triangle in the GPU constitutes an implicit per-pixel DO loop. The particular fragment shading process for each pass was coded as a property of each polygon. For iterative training, this sequence was repeated for each iteration. Throughout the iterations, there is no need to read back data from the graphics memory to the CPU unless the programmer wishes to monitor progress. Graphics memory to host memory transfers are slow in current hardware and programmers typically avoid such operations.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-implemented method comprising:
processing a machine learning technique using a graphics processing unit to obtain results, wherein processing a machine learning technique further comprises using a pixel shader to compute an inner product that is at least one of: (a) a vector inner product; (b) a matrix inner product;
decomposing the inner product into sub-problems and performing multiple passes over the sub-problems using pixel shaders;
using the results to provide solutions for use by a computer application.

2. The computer-implemented method of claim 1, wherein processing a machine learning technique using a graphics processing unit further comprises at least one of: (a) training learnable parameters of the machine learning technique using the graphics processing unit; (b) testing and computing functions of an input and trained learnable parameters using the graphics processing unit; (c) training learnable parameters and testing and computing functions of an input and the trained learnable parameters using the graphics processing unit.

3. The computer-implemented method of claim 1, wherein the results are trained learnable parameters, and further comprising:
training learnable parameters of the machine learning technique using the graphic processing unit to obtain the trained learnable parameters; and
using the trained learnable parameters to obtain the solutions.

4. The computer-implemented method of claim 1, further comprising:
obtaining trained learnable parameters using a central processing unit; and
obtaining results from testing and computing functions of an input and the trained learnable parameters using the graphics processing unit.

5. The computer-implemented method of claim 1, further comprising:
obtaining trained learnable parameters of the machine learning technique using the graphic processing unit; and
testing and computing functions of an input and the trained learnable parameters using the graphics processing unit.

6. The computer-implemented method of claim 1, wherein the computer application is an interactive use computer application that is one of: (a) a speech recognition application; (b) a handwriting recognition application.

7. The computer-implemented method of claim 1, wherein the machine learning technique is a neural network.

8. The computer-implemented method of claim 1, wherein processing a machine learning technique further comprises using a pixel shader to compute an outer product.

9. The computer-implemented method of claim 1, wherein processing a machine learning technique further comprises using a pixel shader to perform a matrix transpose.

10. A computer-readable medium having computer-executable instructions for performing the computer-implemented method recited in claim 1.

11. The computer-implemented method of claim 3, further comprising storing at least some of the trained learnable parameters on the graphics processing unit.

12. The computer-implemented method of claim 8, further comprising computing the outer product using texture mapping.

13. The computer-implemented method of claim 9, further comprising performing the matrix transpose using texture mapping.

14. A process for accelerating and optimizing a machine learning technique using a graphics processing unit, comprising:
training learnable parameters of the machine learning technique to obtain trained learnable parameters;
using the trained learnable parameters to obtain results from the machine learning technique;
using pixel shaders to perform at least one of the following: (a) training learnable parameters; (b) using the trained learnable parameters; and
outputting the results for use by an application;
wherein the machine learning technique uses an Expectation Maximization (EM) technique.

15. The process as set forth in claim 14, wherein the pixel shaders reside on a graphic card.

16. The process as set forth in claim 14, further comprising locating at least some of the trained learnable parameters on the graphics processing unit.

17. The process as set forth in claim 14, further comprising using pixel shaders to compute at least one of: (a) a vector inner product; (b) a matrix inner product; (c) an outer product; (d) a matrix transpose.

18. The process as set forth in claim 14 wherein the machine learning technique is a neural network.

19. The process as set forth in claim 14, wherein the machine learning technique is at least one of: (a) a K-means technique; (b) a Learning Vector Quantization (LVQ) technique.

20. The process as set forth in claim 14, further comprising preprocessing data using the graphics processing unit.

21. One or more computer-readable media having computer-readable instructions thereon which, when executed by one or more processors, cause the one or more processors to implement the process of claim 14.

22. The process as set forth in claim 18, wherein the neural network is at least one of: (a) a multi-layer, fully connected neural network; (b) a convolutional neural network.

23. The process as set forth in claim 20, wherein preprocessing comprises at least one of: (a) normalizing data to put it in better form for input; (b) extracting information and features from the data; (c) obtaining input data and loading the input data onto the graphics processing unit.

24. A computer-readable medium having computer-executable instructions for processing a machine learning technigue using a graphics processing unit, comprising:
   preprocessing query data to obtain input data;
   loading the input data onto the graphics processing unit;
   loading shaders onto the graphics processing unit;
   calling the shaders to process a trained function on the graphic processing unit using the machine learning technigue; and
   obtaining results for use by an interactive use application.

25. The computer-readable medium of claim 24, further comprising using the shaders to compute primitive operations on the graphics processing unit.

26. The computer-readable medium of claim 24, wherein the machine learning technique is a neural network.

27. The computer-readable medium of claim 24, wherein the machine learning technique is a gradient descent technique.

28. The computer-readable medium of claim 24, wherein the interactive use application is a handwriting recognition application.

29. The computer-readable medium of claim 24, wherein the interactive use application is an optical character recognition application.

30. The computer-readable medium of claim 24, wherein the machine learning technique is a gradient descent technique and further comprising:
   storing gradient descent parameters on the graphics processing unit; and
   extending the precision of the gradient descent parameters by storing each parameter in two storage locations, one storage location containing the more-significant digits of the parameter value and the other storage location containing the less-significant digits.

31. The computer-readable medium of claim 25, wherein the primitive operations include at least one of: (a) a vector inner product; (b) a matrix inner product; (c) an outer product; (d) a matrix transpose.

32. The computer-readable medium of claim 27, further comprising having at least some of adjustable parameters of the gradient descent technique reside on the graphics processing unit.

33. The computer-readable medium of claim 28, wherein the machine learning technique is a neural network and further comprising performing classification using the neural network.

34. The computer-readable medium of claim 29, wherein the machine learning technique is a neural network and further comprising performing classification using the neural network.

35. The computer-readable medium of claim 24, further comprising having at least some learnable parameters reside on the graphics processing unit.

\* \* \* \* \*